United States Patent
Ashaari et al.

(10) Patent No.: US 11,314,952 B2
(45) Date of Patent: *Apr. 26, 2022

(54) SENSOR ENABLED LOCATION AWARENESS SYSTEM

(71) Applicant: United States Postal Service, Washington, DC (US)

(72) Inventors: Shahpour Ashaari, Bethesda, MD (US); David C. Lin, Falls Church, VA (US); Seth S. Vasa, Olney, MD (US); Scott R. Bombaugh, Burke, VA (US); Mario Andre Salisbury, Miami, FL (US); Thomas Jay Graham, Chantilly, VA (US); Erich Joseph Petre, Gainesville, VA (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,324

(22) Filed: Mar. 19, 2021

(65) Prior Publication Data

US 2021/0209319 A1  Jul. 8, 2021

Related U.S. Application Data

(63) Continuation of application No. 15/930,826, filed on May 13, 2020, now Pat. No. 10,956,688, which is a continuation of application No. 16/387,872, filed on Apr. 18, 2019, now Pat. No. 10,685,193.

(60) Provisional application No. 62/660,775, filed on Apr. 20, 2018.

(51) Int. Cl.
| | |
|---|---|
| *G06K 7/10* | (2006.01) |
| *G06K 19/077* | (2006.01) |
| *H04W 4/33* | (2018.01) |
| *H04W 4/021* | (2018.01) |
| *H04W 4/35* | (2018.01) |
| *G05B 19/418* | (2006.01) |

(52) U.S. Cl.
CPC ..... *G06K 7/10099* (2013.01); *G06K 7/10475* (2013.01); *G06K 19/07758* (2013.01); *H04W 4/021* (2013.01); *H04W 4/33* (2018.02); *H04W 4/35* (2018.02); *G05B 19/4183* (2013.01)

(58) Field of Classification Search
CPC ....... G06K 7/008; G06K 7/0095; G06Q 10/08
USPC ......................................... 235/376, 375, 487
See application file for complete search history.

(56) References Cited

U.S. PATENT DOCUMENTS

| | | |
|---|---|---|
| 10,235,857 B2 | 3/2019 | Jones |
| 10,699,152 B1 * | 6/2020 | Adam .................. G06K 9/4661 |
| 2006/0229895 A1 | 10/2006 | Kodger, Jr. |
| 2007/0008129 A1 | 1/2007 | Soliman |
| 2007/0188341 A1 | 8/2007 | Seifert |
| 2008/0030359 A1 | 2/2008 | Smith et al. |
| 2008/0143482 A1 | 6/2008 | Shoarinejad et al. |
| 2008/0296373 A1 | 12/2008 | Zmood et al. |
| 2010/0225447 A1 | 9/2010 | Adra |
| 2014/0282257 A1 | 9/2014 | Nixon et al. |

(Continued)

*Primary Examiner* — Edwyn Labaze
(74) *Attorney, Agent, or Firm* — Knobbe Martens Olson & Bear LLP

(57) ABSTRACT

Systems and methods of identifying wearable tags or other items within a facility. The location of the identifiable item can be calculated by the system and used to improve the efficiency of the facility or to dispatch emergency help or maintenance to the location of the badge.

20 Claims, 8 Drawing Sheets

(56) References Cited

U.S. PATENT DOCUMENTS

| | | |
|---|---|---|
| 2015/0298813 A1 | 10/2015 | Cavan et al. |
| 2015/0369618 A1 | 12/2015 | Barnard et al. |
| 2016/0078264 A1 | 3/2016 | Armstrong et al. |
| 2016/0152350 A1 | 6/2016 | Puentes et al. |
| 2016/0371516 A1 | 12/2016 | Debates et al. |
| 2017/0053143 A1 | 2/2017 | Cristache |
| 2017/0067983 A1 | 3/2017 | Teicher |
| 2017/0359412 A1 | 12/2017 | Haebler et al. |
| 2017/0371322 A1 | 12/2017 | Lake et al. |
| 2018/0169858 A1* | 6/2018 | Jain .......................... B07C 5/36 |
| 2018/0240067 A1 | 8/2018 | Oz et al. |
| 2019/0034851 A1 | 1/2019 | Swieter et al. |
| 2019/0362304 A1 | 11/2019 | Vivas Suarez et al. |
| 2020/0017313 A1 | 1/2020 | Mori |
| 2020/0074402 A1* | 3/2020 | Adato ................ G06K 9/00771 |
| 2020/0096599 A1* | 3/2020 | Hewett ................ G06Q 20/203 |
| 2020/0293851 A1 | 9/2020 | Bakke |

\* cited by examiner

SENSOR ENABLED LOCATION AWARENESS SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This Application is a continuation of U.S. application Ser. No. 15/930,826, filed May 13, 2020, now U.S. Pat. No. 10,956,688, which, in turn is a continuation of U.S. application Ser. No. 16/387,872, filed Apr. 18, 2019, which claims the benefit of priority to U.S. Provisional Application No. 62/660,775, filed Apr. 20, 2018, the entire contents of which are incorporated by reference.

BACKGROUND

The present disclosure relates to devices and system for identifying and/or locating a badges or other devices in a facility to assist in the management of the facility. In some embodiments, data about the location of the badges can be used to optimize the running of the facility. The data about the location of the badges can also be used to dispatch maintenance or emergency help to the location of the badge.

SUMMARY

In one aspect described herein, a system for detecting the location of an item comprises a plurality of sensors disposed within a facility at known locations within the facility; an item having a tag associated therewith, wherein the tag includes a unique identifier; a memory storing a virtual map of the facility, the virtual map identifying a plurality of zones within the facility; a processor in communication with the plurality of sensors and with the memory; wherein the plurality of sensors are configured to detect the unique identifier associated with the tag and transmit detection information to the processor; wherein the processor is configured to receive a signal from one or more of the plurality of sensors which detect the unique identifier associated with the tag; determine a location of the tag within the facility based at least in part on the signal from the one or more sensors and the known location of the one or more sensors; associate the tag with one of the plurality of zones on the virtual map based on the determined location; and record the location and the zone association in a record associated with the tag.

In some embodiments, the tag comprises a power supply and a radio frequency transmitter, wherein the radio frequency transmitter is configured to broadcast the unique identifier.

In some embodiments, the radio frequency transmitter is configured to broadcast the unique identifier at a predetermined interval.

In some embodiments, at least one of the plurality of work zones corresponds to item processing equipment.

In some embodiments, the processor is configured to assign the tag to the item processing equipment when the tag is located with the plurality of work zones corresponding to the item processing equipment.

In some embodiments, the system further comprises a plant equipment database, the plant equipment database storing a plurality of unique identifiers corresponding to operators authorized to operate the item processing equipment.

In some embodiments, the processor is further configured to query the plant equipment database using the detected unique identifier; determine whether the unique identifier from the detected tag corresponds to one of the operators authorized to operate the item processing equipment; and authorize the tag to log in to the item processing equipment.

In some embodiments, the system further comprises a user interface, the user interface configured to display the detected location of the tag on the virtual map of the facility.

In some embodiments, the memory further comprises an association between the tag and an operator.

In some embodiments, the tag is part of a badge worn by the operator.

In another aspect described herein, a method for detecting the location of an item comprises disposing a plurality of sensors at known locations within a facility; storing, in a memory, a virtual map of the facility, the virtual map including the known locations of the plurality of sensors, and identifying a plurality of zones within the facility; detecting, via one or more of the plurality of sensors, a unique identifier from a tag within the facility; determining, via a processor, a location of the tag within the facility based at least in part on a signal from the one or more sensors and the known location of the one or more sensors; associating, in a memory, the tag with one of the plurality of zones on the virtual map based on the determined location; and recording the location and the zone association in a record associated with the tag.

In some embodiments, the tag comprises a power supply and a radio frequency transmitter, wherein the radio frequency transmitter is configured to broadcast the unique identifier, and wherein detecting a unique identifier from a tag comprises receiving the broadcast unique identifier from the tag.

In some embodiments, the radio frequency transmitter is configured to broadcast the unique identifier at a predetermined interval.

In some embodiments, at least one of the plurality of work zones corresponds to item processing equipment.

In some embodiments, the method further comprises assigning the tag to the item processing equipment when the tag is located with the plurality of work zones corresponding to the item processing equipment.

In some embodiments, the method further comprises querying, via a processor, a plant equipment database using the detected unique identifier, the plant database storing a plurality of unique identifiers corresponding to operators authorized to operate the item processing equipment; determining, via a processor, whether the unique identifier from the detected tag corresponds to one of the operators authorized to operate the item processing equipment; and authorizing, via a processor, the tag to log in to the item processing equipment.

In some embodiments, the method further comprises displaying, on a user interface, the detected location of the tag on the virtual map of the facility.

In some embodiments, the method further comprises associating the tag with an operator within the facility.

In some embodiments, the tag is part of a badge worn by the operator.

In another aspect, a system for detecting the location of an item comprises disposing a plurality of sensors at known locations within a facility; means for storing a virtual map of the facility, the virtual map including the known locations of the plurality of sensors, and identifying a plurality of zones within the facility; means for detecting a unique identifier from a tag within the facility; means for determining a location of the tag within the facility based at least in part on a signal from the one or more sensors and the known location of the one or more sensors; means for associating the tag with one of the plurality of zones on the virtual map based on the determined location; and means for recording the location and the zone association in a record associated with the tag.

DETAILED DESCRIPTION

Figure 1:
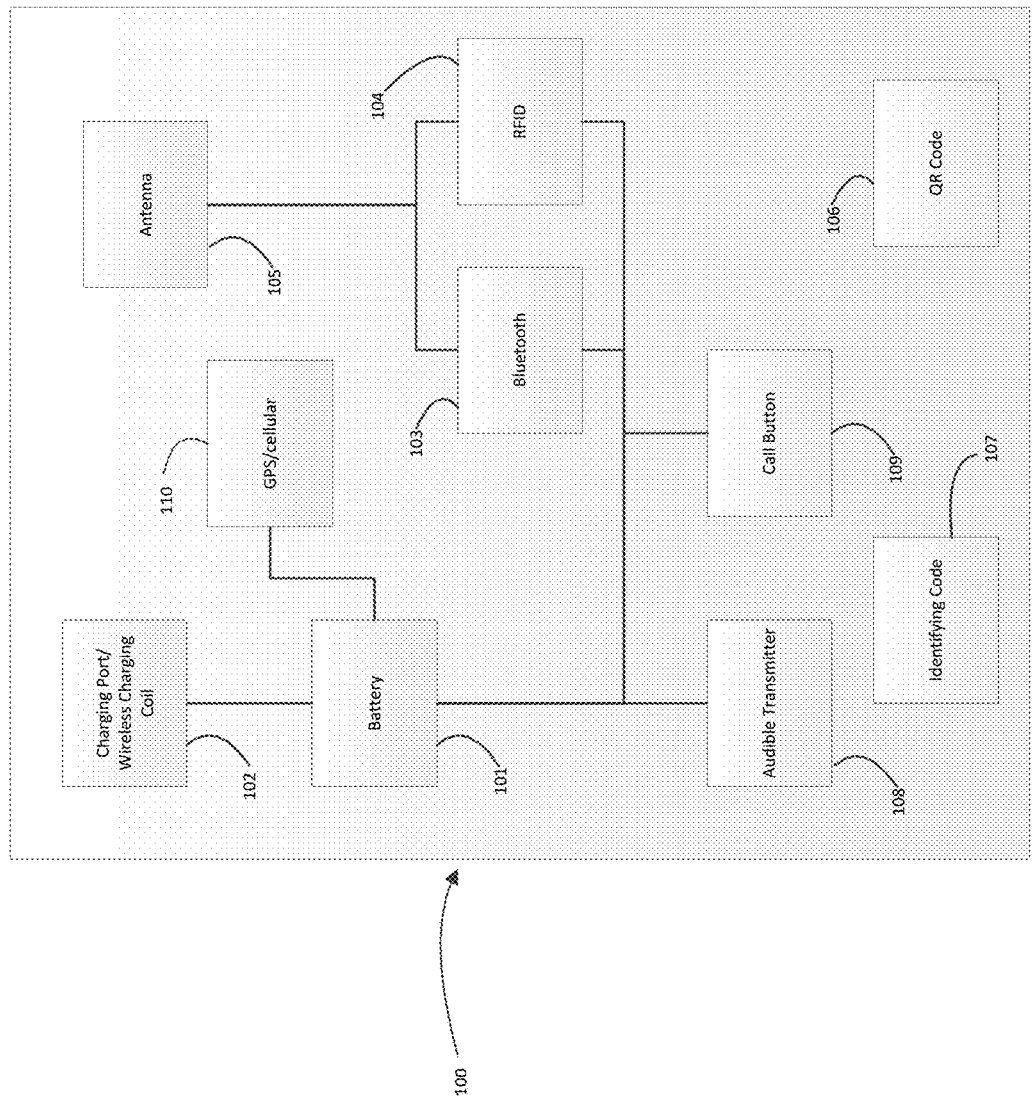
FIG. 1 depicts an embodiment of the badge that can be used in the described system.

In the following detailed description, reference is made to the accompanying drawings, which form a part thereof. In the drawings, similar symbols typically identify and/or locate similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Some aspects of the present disclosure relate to systems and methods for providing location information including sensor coordinates and other services using a radio frequency identification, Bluetooth low energy, vision enabled, or other items, such as a tag or badge in a facility. The item can be an a tag or sensor on an item, such as a mailpiece, employee badge, a vehicle, such as a powered industrial vehicle (PIV), forklift, rolling stock, such as a bin, hamper, pallet, shelf, cart, etc., a machine tag on a piece of item processing equipment, such as mail processing equipment (MPE), and any other desired item, and can be used to both capture and identify the coordinates within a predefined area to identify and/or locate position, movement and behaviors of an item assets. The discoverable item can also be used to identify and/or locate the plant equipment that the employee is using. As used herein, the term plan equipment can be used to describe any equipment used by an employee in a facility, such as, for example, fork lifts, sorting machines, mail processing equipment, conveyor belts, or a delivery barcode sorter. As used herein, the term badge can be used to mean any type of portable object that can be carried by an employee or on a vehicle or other machine that can contain the necessary circuits or displayable identifiers and/or computer readable codes or other codes to perform the functions discussed below.

In some embodiments, the badge or tag is identified and/or located via various sensors in a facility. The sensors can identify and/or locate the badge via cameras, distance sensors, signal strength sensors, a mesh network, or a connection sensor as will be described herein. The sensors and network used for identifying and/or locating the trackable item or the badge can be similar to those described in U.S. patent application Ser. No. 15/862,003, filed Jan. 4, 2018, entitled Beacon Enabled Distribution Items, the entire contents of which are hereby incorporated.

FIG. 1 depicts an embodiment of the identifiable and/or locatable item, such as a tag that can be used in the described system. A tag 100 is shown. The tag 100 can be incorporated into a badge, into an item location tag, or in other items or contexts described herein. The tag 100 contains a power supply 101. In some embodiments, power supply 101 can be a chemical cell battery, such as a lithium ion, nickel cadmium, and the like, and can have a variety of form factors. In some embodiments, power supply 101 can be any other type of device that can store electrical energy, such as a capacitor. In some embodiments, the power supply 101 can be a photoelectric cell. In some embodiments, power supply 101 can be electrically connected to a charging port/wireless charging coil 102. In some embodiments, charging port/wireless charging coil 102 can be a connection on the tag 100 where a power cord can be plugged into tag 100 to charge power supply 101. In some embodiments, the battery is configured to last at least one year of continuous use without charge. In some embodiments, the charging port/wireless charging coil 102 can also be a wireless charging coil for charging power supply 101 that can receive wireless energy from a wireless energy transmitter. In some embodiments, charging port/wireless charging coil 102 can be either a charging port or a wireless charging coil or both.

In some embodiments, power supply 101 can also be powering Bluetooth enabled chip 103 and RFID enabled chip 104, which can transmit and receive through antenna 105. Bluetooth enabled chip 103 and RFID enabled chip 104 can be integrated circuits with broadcasting and receiving capability, a paper-thin circuit, such as a circuit printed onto a surface. In some embodiments, the RFID enabled chip 104 can be a hybrid RFID chip. The Bluetooth enabled chip 103 and RFID enabled chip 104 can be connected to a visual indicator (not shown), such as an LED to demonstrate when the chips are receiving power. The Bluetooth enabled chip 103 and RFID enabled chip 104 can have a memory, which can store a unique identifier and can transmit a signal with the unique identifier so as to be identified by a reader or some other device. In some embodiments, Bluetooth enabled chip 103 and RFID enabled chip 104 can also transmit other data such as the battery life of the badge. The Bluetooth chip can pair, via a Bluetooth connection, or can simply transmit a signal. In some embodiments the Bluetooth enabled chip 103 and RFID enabled chip 104 broadcasts continually, intermittently, or periodically. In some embodiments, the Bluetooth enabled chip 103 and RFID enabled chip 104 emits a signal only in response to an interrogation signal. In some embodiments, the Bluetooth enabled chip 103 and RFID enabled chip 104 can be used to connect with sensors or plant equipment that are in the facility. It is to be understood that the badge could also contain any other types of chips for receiving and sending wireless signals of various protocols, for example, a Wi-Fi or NFC chip. It is to be further understood that any references to a Bluetooth or RFID chip within this specification could also refer to the use of any type of chips for receiving and sending wireless signals of various protocols, for example, a Wi-Fi chip. In some embodiments, the tag 100 may comprise only a Bluetooth enabled chip 103, or only a RFID enabled chip 104 without departing from the scope of this disclosure. In some embodiments, the Bluetooth enabled chip 103 and the RFID enabled chip 104 could be used to log in to, provide credentials to, or allow access to one or more pieces of equipment or vehicles in a facility. The Bluetooth enabled chip 103 and the RFID enabled chip 104 can be programed or altered to selectively allow access to the equipment over the course of a shift, or from day to day. In some embodiments, the equipment can be programed to recognize only signals from specific Bluetooth chips 103 and/or RFID chips 104, and to only allow access to operate when a specific badge is in proximity to the equipment.

In some embodiments, the Bluetooth enabled chip 103 and/or the RFID enabled chip 104 can be passive RFID components which are designed to emit a unique signal when interrogated or exposed to an energy source. In some embodiments, for example, where the tag 100 uses a passive RFID component, the tag 100 need not include a power supply 101.

In some embodiments, the tag 100 can also comprise a computer readable identifier or human readable identifier. As shown, the tag 100 includes a QR code 106 or identifying code 107. In some embodiments, QR code 106 or identifying code 107 represents a unique visual code that can be used to identify and/or locate the badge. In some embodiments, the QR code 106 or identifying code 107 can be recognized by an optical camera, and the tag 100 can be read and identified and/or located via cameras in a facility in order to determine the location and movement of the tag 100 in a facility. In some embodiments, identifying code 107 can be a unique patch of reflective material that can be used as a target by distance sensors to determine how far away the badge is and what identity the badge is. In some embodiments, this is done via detecting a unique pattern of reflective light off of the badge, using, for example, a radar or Lidar system. In some embodiments, QR code 106 or identifying code 107 can also be used to gain access to plant equipment via scanning the code to get authorization. In some embodiments, the tag 100 does not include a QR code 106 and/or an identifying code 107.

In some embodiments, the tag 100 can also comprise an audible transmitter 108. In some embodiments, the audible transmitters 108 can receive a signal from Bluetooth enabled chip 103 or RFID enabled chip 104 and send then sound an audible signal or vibrate. For example, the audible transmitter could beep and vibrate if the tag 100 enters a hazardous area.

In some embodiments, tag 100 can also comprise a call button 109. In some embodiments, pressing the call button 109 can send a signal to a server, to a supervisor, or to another system as an alert. The alert message may be a request for maintenance or request help. The call button 109 can then transmit this request through Bluetooth enabled chip 103 or RFID enabled chip 104. In some embodiments, the call button 109 can be pushed or actuated to mark the start or end of an activity, such as an operation on MPE, the start or end of a shift, as a stopwatch or timing device, and the like.

The tag 100 can include a geolocation module such as GPS/cellular module 109 connected to the battery. The GPS/cellular module 109 include either GPS, cellular, or both capability to the tag 100. The GPS/cellular module 109 can be optional, and may not be included where a tag 100 is used primarily within a facility, or in other places where GPS is inaccurate or unavailable. For example, where a tag 100 is to be used on an item, such as a parcel, a GPS module 109 can advantageously be included. Where a tag 100 is used in a badge assigned to an operator within a facility, a GPS module 109 may not be included.

Figure 2:
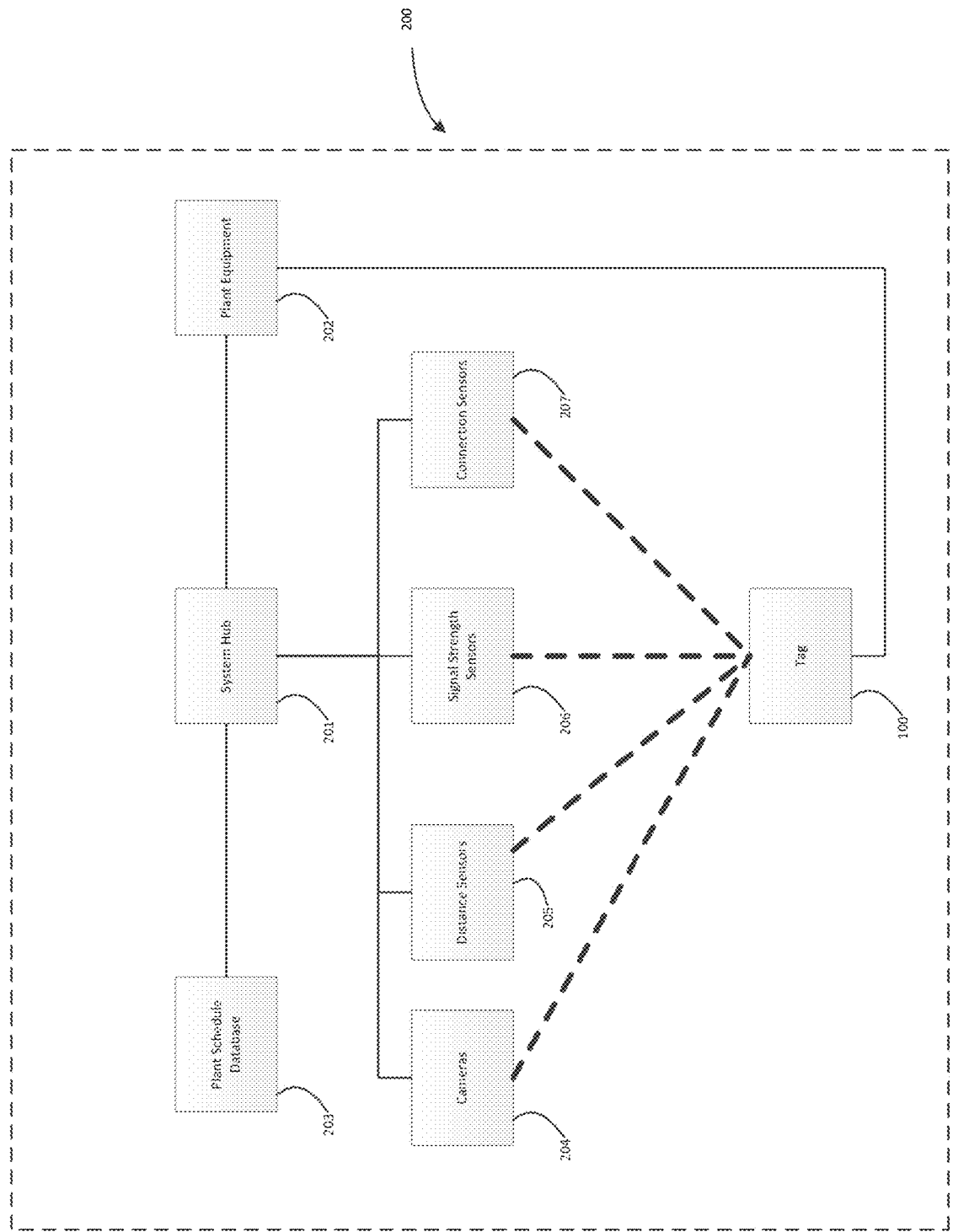
FIG. 2 displays an example of a sample system 200 that can be used to track badges in a sample facility.

FIG. 2 displays an example of a sample system 200 that can be used to identify and/or locate badges in a sample facility. In some embodiments the system comprises a system hub 201. System hub 201 includes a processor and a memory for carrying out all the functions of the system hub 201. The system hub 201 is in wired or wireless communication with a tag 100, plant equipment 202, a plant schedule database 203, one or more cameras 204, a distance sensor 205, a signal strength sensor 206, and a connection sensor 207. In some embodiments, the system hub 201 can be used to coordinate the various components of the system 200. In some embodiments, system hub 201 can use the information it receives from the other components of system 200 to determine the location of the tag 100 within a facility, the route that the tag 100 has taken in a facility, location, and the amount of time the tag 100 spent in a given location.

System 200 also comprises plant equipment 202. In some embodiments, plant equipment 202 can be used to describe any equipment used in a facility, such as, for example, fork lifts, sorting machines, conveyor belts, delivery barcode sorters, or other facility equipment. In some embodiments, plant equipment 202 can be in communication with tag 100 or tag 100 can be used to log in to plant equipment 202. In some embodiments, users can use tag 100 to log into plant equipment 202. In some embodiments, plant equipment 202 can have their own consoles, as described later, and the consoles can be used to either scan identifying code 107 or QR code 106 in order to log the user onto plant equipment 202. In some embodiments, the plant equipment 202 can be connected to the location awareness system and automatically register a tag 100, such as an employee badge log-in, based on the proximity or location of the tag 100 to the plant equipment 202. In the example of a forklift, the forklift may require a properly authenticated or authorized tag 100 to be present within a defined zone or boundary around the forklift before the forklift can be operated. This can also apply to fixed plant equipment and machinery.

In some embodiments, plant equipment 202 can connect to tag 100 through Bluetooth enabled chip 103 and RFID enabled chip 104, or detect the presence of the tag 100 within a zone of the plant equipment 202, in order to have the user log into plant equipment 202. In some embodiments, the console can receive a unique identifier broadcast by the Bluetooth enabled chip 103 and/or the RFID enabled chip 104. The console can send the received signal to the system hub 201, and the system hub 201 can check an access list or authorization list for the received unique identifier. When unique identifier received at a console on plant equipment is on the authorization list, or when the unique identifier associated with the tag 100 is received within the zone or proximity of the plant equipment 202, the console can allow access to the user, or can allow the user scanning the tag 100 at the console to log-in and operate the equipment. In some embodiments, plant equipment 202 can communicate the time that a particular badge was logged into plant equipment 202 to the system hub 201, and that information can be stored. In some embodiments, the system hub 201 can use the login information to help determine the location of the wearer of tag 100.

The system hub 201 is in communication with plant schedule database 203. In some embodiments, plant schedule database 203 contains the time that certain employees (who, for example, are wearing tags 100 on, in, or as badges) should be operating plant equipment 202. In some embodiments, the system hub 201 can use the data in plant schedule database 203 to help determine the location of the badges 100. In some embodiments, if system hub 201 determines that a user wearing a tag 100 is not currently operating a piece of plant equipment 202, because, for example, the machine run is complete, the employee has moved away from the plant equipment 202 for some specified period of time, etc., the system hub 201 can notify the wearer of tag 100 through audible transmitter 108, or an alert can be generated for a supervisor.

In some embodiments, the system hub 201 is in communication with cameras 204. In some embodiments, cameras 204 can be used by system hub 201 to identify the location of tag 100. In some embodiments, the camera can optically discern or recognize the tag 100 as well as various markings on the floor of the facility where the system 200 is installed or being used. For example, the facility can be marked with special markings on the floor at specified intervals, for example, every 2 feet, every 1 meter, or any other desired interval. High contrast markings can be used to delineate zones or boundaries around plant equipment 202. A comparison of the location of the badge and the floor markings in the view of the camera can be used to determine the location of the tag 100. In other embodiments, the location can be determined based on which camera can view the tag 100, the locations of the cameras 204, the field of view of those cameras 204, or the like.

In some embodiments, system hub 201 is in communication with distance sensors 205, signal strength sensors 206, and connections sensors 207. In some embodiments, all three types of sensors can be included in the same physical enclosure. In some embodiments, one of the cameras of cameras 204 can also be in that enclosure. In some embodiments, the system hub 201 can use the information collected by all these sensors and the cameras 204 to determine the location in the facility of tag 100 and respective assets.

In some embodiments, distance sensors 205 can determine the distance from the sensor to the badge. In some embodiments, this is done through LIDAR or other technology. In some embodiments, distance sensors 205 can identify and/or locate the precise tag 100 that they are detecting by detecting a unique pattern of reflection of identify code 107. In some embodiments, distance sensors 205 can determine the location of the tag 100 in the facility based on the time difference of arrival of various signals sent between the sensors 205 and the tag 100. In some embodiments, the signals can be ultra wideband radio frequency signals. In some embodiments, the distance sensors 205 can be Ultra-Wideband distance sensors.

In some embodiments, signal strength sensors 206 can measure the signal strength of a connection between the Bluetooth or RFID chips 103, 104 of tag 100 and the signal strength sensors 206. In some embodiments, the signal strength sensors 206 can determine what tag 100 they are connected to or in communication with based on the unique ID broadcasted by the Bluetooth or RFID chips 103, 104 of tag 100. By evaluating the signal strengths received at various signal strength sensors 206 in the facility, the system hub 201 can determine the location of the tag 100 within the facility.

In some embodiments, connection sensors 207 can determine whether or not they are connected to, paired with, or in communication with a tag 100 in a similar way as to signal strength sensors 206. In some embodiments, the location of the tag 100 can be determined by triangulating based on the signal strengths received at the various connection sensors 207.

In some embodiments, connection sensors 207 can also determine the angle of arrival of the signal they are connecting to. In some embodiments, receiving an angle of arrival from multiple connection sensors 207 can be used to determine the location of signal that is being emitted, e.g. the signal being emitted from the tag 100. In some embodiments, the location is determined within one-meter accuracy. In some embodiments, connection sensors 207 are Bluetooth Low Energy sensors, such as those provided by Quuppa, LLC. In some embodiments, connection sensors can determine the location by scanning an area with a tightly focused signal in a rasterized pattern. When the sensor receives a notification that a connection has occurred, or a unique ID broadcast from the tag 100 is detected, the sensor or array of connection sensors 207 can determine the location of the tag 100 based on the particular area that the signal was being focused on when the tag 100 was recognized, detected, or connected to. In some embodiments, the tightly focused signal can be an ultra-high frequency radio frequency signal.

Figure 3:
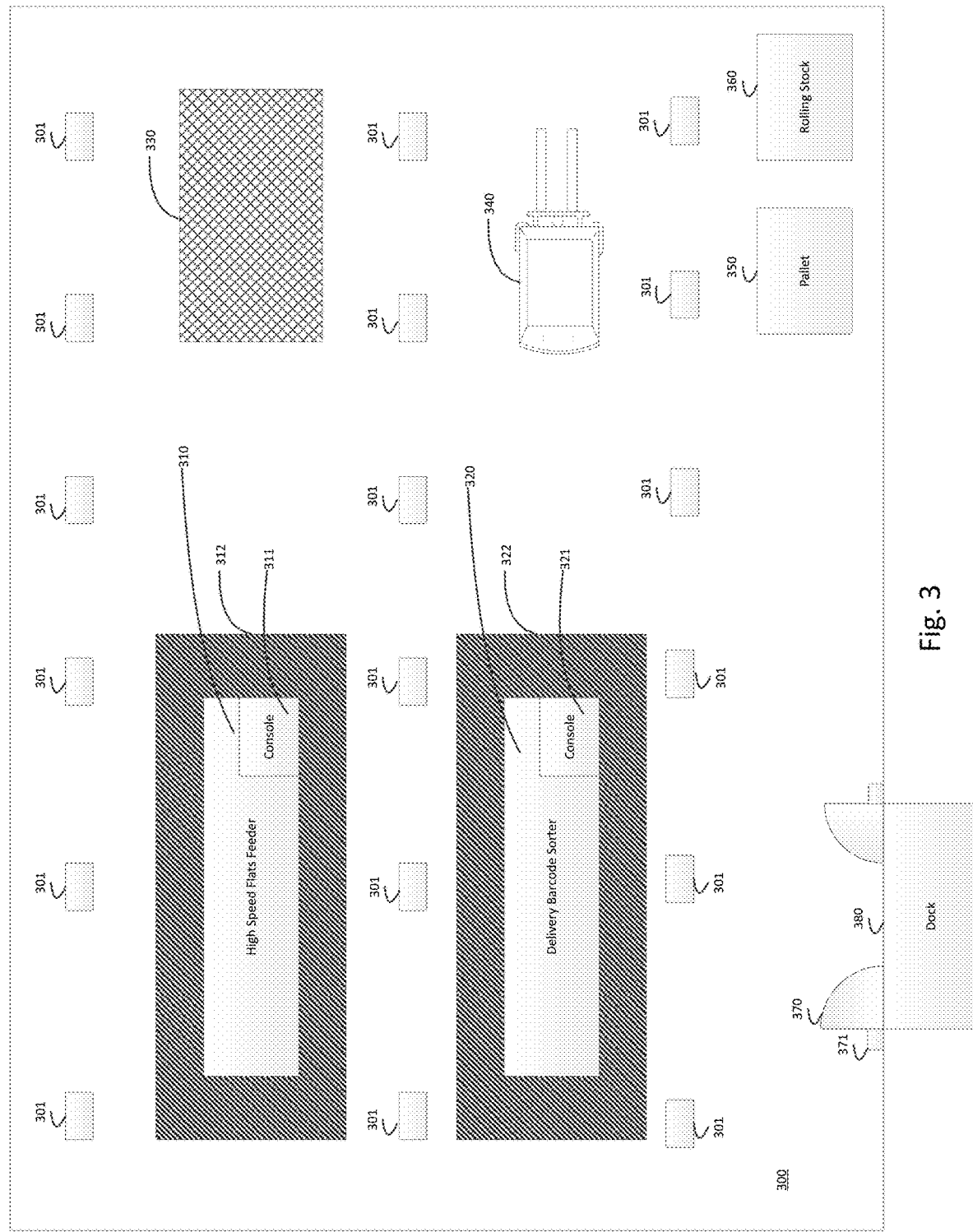
FIG. 3 displays a sample facility with a system 200 installed in it.

FIG. 3 shows a top view of an exemplary facility 300 utilizing an item detection system similar to those described herein. In some embodiments, the facility 300 has various sensors 301 installed in the ceiling, floor, or other locations. In some embodiments, sensors 301 can be any combination of cameras 204, distance sensors 205, signal strength sensors 206, and connection sensors 207. In some embodiments, in order to reduce power requirements, sensors 301 only collect data periodically. In some embodiments, this can be done using a low power sleep mode, and a high power detect mode. In some embodiments, the sensors 301 cycle through these two modes every 1 second, 5 second, or other period of time. In some embodiments, the sensors 301 can be always on and can be detecting and monitoring the locations of a plurality of badges 100 in the facility 300. In some embodiments, the sensors 301 can be activated periodically and monitor for a fixed duration of time, or to take a snapshot of the locations of badges 100 and equipment and vehicles, or can be manually activated at the request of distribution network personnel. In some embodiments, the sensors 301 can be always on or always active.

In some embodiments, the facility 300 can contain first plant equipment 310. As an example, a mail sorting equipment is shown. In some embodiments, first plant equipment 310 has a console 311 that can be used to log onto the first plant equipment 310 in the manner previously described. In some embodiments, plant equipment 310 is surrounded by a zone 312. In some embodiments, the zone 312 can be a 1 meter, 2 meter, or other distance area surrounding plant 310. In some embodiments, zone 312, can be marked by insignia on the floor, high contrast tape or markings, or other markings, or be unmarked. In some embodiments, the sensors 301 can be used by system hub 201 to determine if tag 100 is within zone 312 in order to log the operator into the first plant equipment 310, to determine if the wearer of tag 100 is operating plant equipment 310 or for other reasons described herein. In some embodiments the zone 312 corresponds to a virtual fence around the first plant equipment 310 which is stored in the system hub 201, which can have a map of the facility with equipment and virtual fences stored therein.

The facility 300 also has second plant equipment 320. As an example, the second plant equipment 320 can be a delivery barcode sorter, or DBCS. The second plant equipment 320 comprises a console 321 and is surrounded by a zone 322 similar to zone 312.

In some embodiments, the facility 300 can contain a hazard zone 330. In some embodiments, hazard zone 330 can be a zone in the facility 300 that personnel or items should not enter. In some embodiments, the hazard zone can be designated as being surrounded or comprising a virtual fence using system hub 201. In some embodiments, when the system hub 201 determines that a tag 100 is within a hazard zone, it can send an alert to the wearer of tag 100 through audible transmitter 108. This determination can also cause a message or warning to be sent by the system hub 201 to a supervisor, operator, or other entity.

In some embodiments, system hub 201 can define the zones 312, or 322 around the plant equipment and hazard zone 330. In some embodiments, users of system hub can manually define these zones by inputting the precise coordinates and/or dimensions that define the zone. In some embodiments, system hub 201 can use an intelligent workzone module to define and auto-calibrate the zones based on the sensor data of sensors 301. For example, system hub 201 can collect data from sensors 301 for a period of time for a known operator of a specific piece of plant equipment. After passively gathering the sensor tag location data from normal work flow over the defined period, either a supervised and/or an unsupervised machine learning statistical model is applied to the sensor location data to identify the probable work zone which is defined as the collection of 99.99% of sensor coordinates. With time, the data will improve the accuracy and precision of the intelligent work zone definition model. The process for generating a work zone or boundary will be described in greater detail below.

In some embodiments, the facility 300 can contain mobile plant equipment such as forklift 340. In some embodiments, mobile plant equipment allows for the same log-in procedure as the first and second plant equipment 310, 320, but there is no fixed corresponding zone that surrounds the mobile equipment. In some embodiments, there can be a moveable zone surrounding the forklift 340 that moves as the forklift 340 moves. In some embodiments, the forklift 340, and any other mobile equipment can itself be located by the system 200 by installing similar components into the mobile equipment as are in tag 100. In some embodiments, the system can locate both mobile equipment and badges 100 and then issue a warning if mobile equipment and badges 100 are approaching each other to prevent collisions. In some embodiments, these warnings are emitted through audible transmitter 108 in either the badge or the mobile equipment, if the mobile equipment contains similar components as the badge. In some embodiments, a tag 100 can be used to access the forklift 340 through a console as described elsewhere herein. The tag 100 can be associated with the forklift 340 in the system 200. As the tag 100 moves through the facility 300, the system hub 201 can locate the forklift 340 based on identifying and associating the tag 100 to the forklift. In some embodiments, the system hub 201 can draw a virtual fence around the forklift 340, or around any mobile equipment accessed by the badge, the size and shape of the fence depending on the type of mobile plant equipment.

In some embodiments, the when a forklift or other equipment is operating, and the forklift 340 approaches the hazard zone 330 or nears the virtual fence of the hazard zone, the sensors 301 and the system hub 201 can determine that the position of the forklift 340 has crossed the virtual fence boundary of the hazard zone 330, or is within a threshold distance from the hazard zone 330, the tag 100 on the forklift 340 or on the operator, or both, can emit an audible, visual, tactile, or other type of alert. In some embodiments, the system hub 201 can send a signal to the forklift 340 to shutdown, or to prohibit movement of the forklift 340 into the hazard area 330. In some embodiments, the alert can be sent when the tag 100 is identified to be within a threshold distance of the virtual fence, and the forklift can shut down if the forklift 340 crosses the virtual fence, or crosses a second threshold distance from the hazard zone 330. In some embodiments, the same process can apply to other areas of the facility 300, not just to the hazard zone 330. For example, if it is not desired to have forklifts in a certain area of the facility 300, or if pallet jacks should not be located somewhere, the system 200 can alert or prevent movement or operation of the plant equipment 202 in specified areas of the facility 300.

In some embodiments, the facility 300 can also contain any number of pallets 350 or rolling stock 360. Pallets and rolling stocks can be used to transfer items around the facility 300 or out of the facility 300, such as out to loading dock 380. In some embodiments, pallets 350 and rolling stock 360 can also be assigned identifiable medium or tag that can be identified and/or located by the system similar to the badges 100 assigned to employees. In some embodiments, these sensors can contain unique identifying codes that can be used to identify the assets, i.e. a pallet or rolling stock badge.

In some embodiments, the facility 300 can contain doors 370 and door sensors 371. In some embodiments, door sensors 371 can detect when something moves through the doors 370. In some embodiments, door sensors 371 can send sensed information to system hub 201.

In some embodiments, system hub 201 can determine when badges 100 or pallets 350 and rolling stock 360 enter and exit the facility 300 based on the sensors 301 and door sensors 371. For example, if the system hub 201 determines that a pallet or rolling stock has a position within the facility 300 and then it enters or passes through the door 370, activating one of the door sensors 371, the system hub 201 can make logical determinations about the pallet or rolling stock. In the case of the rolling stock moving from a sorting portion of the facility 300 through the door 370 to a loading dock, the system hub 201 can determine that the pallet, and all the distribution items thereon are moving through the mail stream toward a transportation vehicle. The movement of the pallet from a sorting section to a dock can be recorded and stored as a logical handling event for the pallet moving toward the dock. This removes the need for the pallet to be manually scanned at different locations, or as the pallet transits through the facility 300. In the case the pallet is detected first on the loading dock, the door sensor 371 detects the pallet, and then the pallet is in the sorting portion of the facility 300, the system hub 201 can similarly determine and store a logical handling event. As the pallet moves through the door 370, the system hub 201 can prepare or access a sort plan for the pallet, and can instruct facility 300 resources to move the pallet to a particular piece of processing equipment 310-320, or can instruct the resources to hold the pallet in a particular zone until the pallet is required.

In some embodiments, the battery 101 in the tag 100 can be rapidly depleted if the broadcast rate or ping rate of the Bluetooth chip 103, the RFID chip 104 and/or the GPS module 109 is high. The system 200 can use logic to determine that when a tag 100 is located within the facility 300, the ping rate of the various components, or the broadcast rate of the components can be reduced. In some embodiments, when the tag 100 is located indoors, the GPS/cellular module 109 can be turned off, or reduced to ping once per day, once per every 4 hours, or another desired ping rate. In some embodiments, the GPS/cellular module 109 is turned off until the tag 100 is located outside the facility 300. This can occur based on a logical handling event, e.g., a tracking system sees the tag 100 was assigned to be transported outside the facility 300. In some embodiments, the GPS portion of the GPS/cellular module 109 can be turned off, and the cellular ping rate is reduced. The cellular ping outside a facility 300 can indicate to the tag 100 that the GPS portion of the GPS/cellular module 109 should be turned back on.

In some embodiments, when the tag 100 is detected to not be in a facility 300, the Bluetooth chip 103 and/or the RFID chip 104 can be turned off in order to conserve the battery 101. When the tag 100 is detected moving within a geofence of, for example, the facility 300, the Bluetooth chip 104 and/or the RFID chip 104 can be turned on in order to identify the tag 100 location within the facility 300.

Such activities can conserve the battery 101 to ensure the tag 100 can operate as required as the item on which the tag 100 is located moves through the distribution network.

Figure 4:
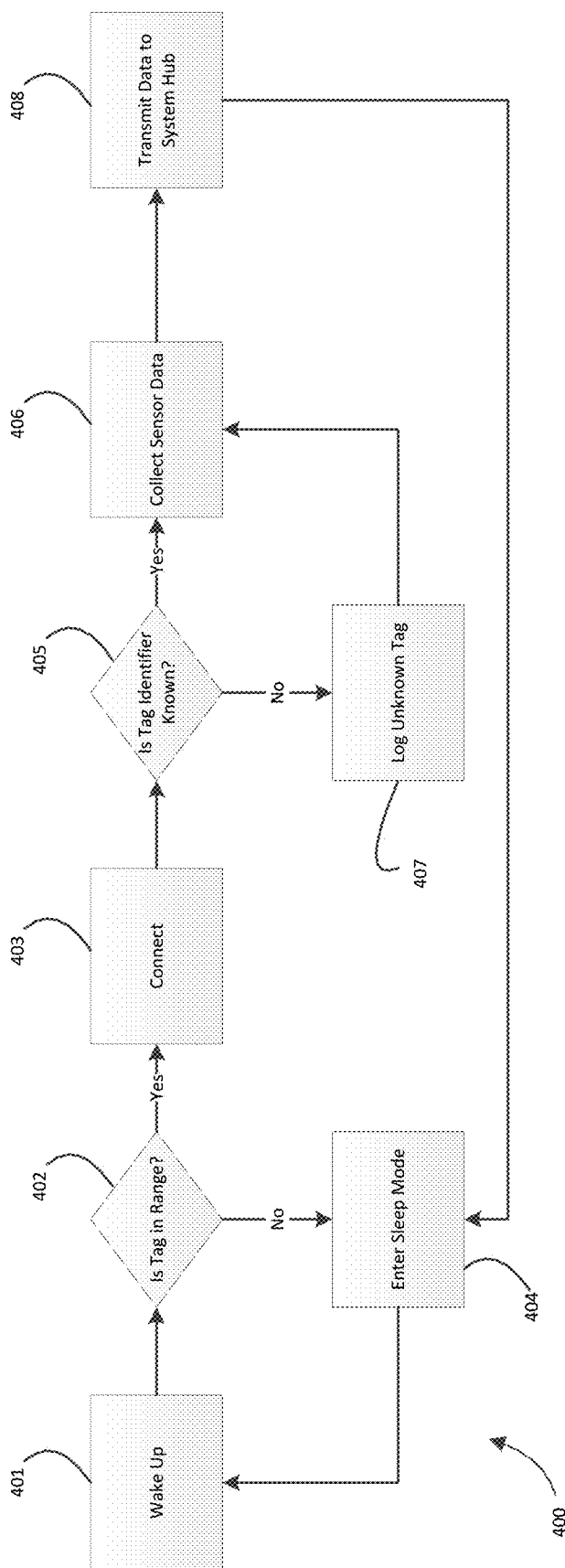
FIG. 4 displays a flow chart depicting a process for collecting data using sensors of the systems described in FIGS. 2 and 3.

FIG. 4 shows a flow chart depicting a process 400 for collecting data using sensors 301. In process block 401, sensors 301 wake up from sleep mode. As noted elsewhere, the wake up process can occur with a specified periodicity, at a set time of day, or, upon receipt of a wake-up signal from an automated system or from a supervisor, such as a request to locate one or more tags. In some embodiments, the sensors 301 may be continuously operating and do not need to wake.

The process proceeds to decision block 402, wherein it is determined if one or more of a tag, such as a badge or item tag, is in range for the sensors 301 to detect. If sensors 301 are comprised of cameras 204 or distance sensors 205, sensors 301 determines if they can see or detect the tag. If sensors 301 are comprised of signal strength sensors 206 or connection sensors 207, sensors 301 determine if they can form a connection with tag 100's Bluetooth enabled chip 103 and RFID enabled chip 104.

If the sensors 301 do not detect a tag 100, the process proceeds to process block 404. In process block 404, the sensors 301 enter into a sleep mode before then returning back to process block 401. In some embodiments, the sleep mode can last for one second, five seconds, one minute, one hour, or another amount of time.

If sensors 301 do detect one or more tags 100, the process then proceeds to process block 403. In process block 403, the sensors 301, if sensors 301 comprise signal strength sensors 206 or connection sensors 207, connect with tag 100's Bluetooth enabled chip 103 and/or RFID enabled chip 104. The system hub 201 can record the tag 100 location within the facility 300, using the locating/positioning systems and methods described herein, and can update the tag 100 position or location, and can update records regarding the tag 100. In the case where the tag 100 is in a badge, the system hub 201 can record or update records or information regarding the position of the wearer assigned the tag 100 or the wearer's movement, compare the assigned activity to the wearer location, and other similar analytical processes. The process then proceeds to decision block 405.

In decision block 405, the sensors 301 determine if they can identify the tag or tags) 100 that they are connected to or detecting. In some embodiments, the sensors 301 can identify the tag 100 using a unique code or identifier signal broadcast by tag 100's Bluetooth enabled chip 103 and/or RFID enabled chip 104. The system hub 201 can identify the tag 100 based on the received unique code or identifier signal. In some embodiments, the sensors 301 can determine the identity of the tag 100 by viewing the identifying code 107 and/or QR code 106. In some embodiments, sensors 301 can identify the badge by detecting a unique pattern of light reflected off of identifying code 107.

If the sensors 301, or the system hub 201 cannot identify the tag 100, the process proceeds to process block 407. In process block 407, the sensors 301 log the badge as unknown. The process then proceeds to process block 406. If the sensors 301 can identify the tag 100, the process proceeds directly to process block 406.

In process block 406, sensors 301 collect all the sensor data for the badge (or badges) 100 in range, as has been previously described. In some embodiment, this data is associated with the unique code, unique identifier signal, or other badge identifier for the tag 100 it is collected from. In some embodiments, if the badge cannot be identified, the sensor data is associated with an unknown badge flag or identifier. The process then proceeds to process block 408.

In process block 408, the sensors 301 transmit all the collected data to system hub 201. Within the sensor hub 201, the collected sensor data is analyzed for various purposes. For example, the location of tag 100 within the facility 300 can be recorded. In some embodiments, the location of the tag 100 with regard to a virtual fence, boundary, etc. can be recorded. When the position of a tag 100 is determined, that position can be compared to a map or virtual version of the facility 300 within the system hub 201. If the determined location is within a virtual fence, zone, or boundary, the presence of the tag 100 within that boundary is recorded. In some embodiments, the presence of the tag 100 can generate an alert or cause an action to be taken. The process then returns to process block 404. In some embodiments, the sensors 301 may transmit data to the system hub at any time during the process. A person of skill in the art will understand the communication between the sensors 301 and the system hub 201 can occur at any time without departing from the scope of the current disclosure.

Figure 5:
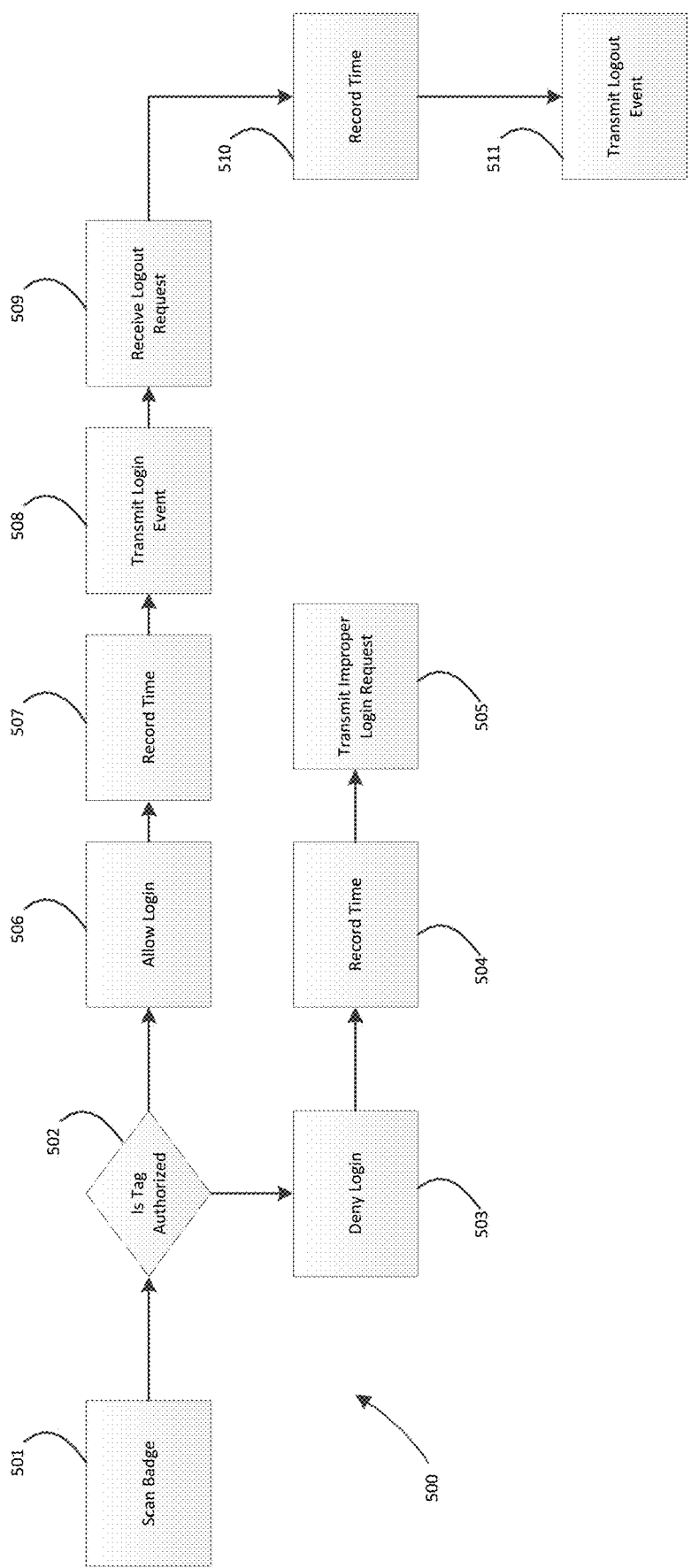
FIG. 5 displays a flow chart depicting a process for logging on/off to plant equipment using a badge.

FIG. 5 shows a flow chart depicting a process 500 for logging on/off to plant equipment 202, such as, but not limited to, the first and second plant equipment 310, 320, and the forklift 340 using a tag 100. In some embodiments, the process starts with process block 501. In process block 501, plant equipment 202 scans QR code 106 of tag 100. In some embodiments, plant equipment can use its associated console, such as console 311, to do the scan. In some embodiments, the plant equipment can "scan" the tag 100 by instead connecting to with tag 100's Bluetooth enabled chip 103 and/or RFID enabled chip 104 and receiving the tag 100's unique signal or code. The process then proceeds to decision block 502. In some embodiments, the scan of the tag 100 (or badge) can include detecting the location of the tag 100 within a zone determined or set for the plant equipment 310. For example, if an operator is assigned to a particular machine, such as a DBCS, the operator, wearing a badge or other device having a tag 100 thereon, will move within a zone, boundary, or virtual fence established for the DBCS.

In some embodiments, the plant equipment 202 can have a sensor 301 thereon. The sensor 301 can be tuned to detect tags 100 within a certain radius or distance from the sensor. The scanning of step 501 can occur when a tag 100 comes within the certain radius or distance established for the sensor 301 on the plant equipment 202. For example, if an operator is assigned to operate a DBCS, as the operator, wearing a tag 100, approaches within When the tag 100 is scanned at the plant equipment 202, or if the tag 100 is detected within the zone, boundary, or virtual fence for the plant equipment 202, or when a sensor on the plant equipment identifies a badge within a certain radius or distance, the process 500 moves to decision block 502, wherein it is determined if the badge is authorized for the plant equipment 202. In some embodiments, the plant equipment 202 compares the scanned QR code or received signal, identifier, or code to the authorized identifiers or codes to those associated with or authorized for the plant equipment 202. This authorization decision can be performed by processors or computing systems at the plant equipment, or in the system hub 201, or in any other desired system. If the tag 100 is not authorized to access, use, or operate the plant equipment 202, the process the proceeds to process block 503.

In process block 503, plant equipment 202 denies the login attempt before proceeding to process block 504. In process block 504, plant equipment 202 records the time of the attempted login and then proceeds to process block 505, where the time and the identifier that attempted to improper login is transmitted to system hub 201.

If the tag 100 is authorized, or if the wearer to whom the tag 100 is assigned is authorized, the process proceeds to process block 506. In process block 506, the plant equipment 202 allows the tag 100 to log in thereby allowing the wearer of tag 100 to operate the plant equipment. The instance of the log in, the identity of the tag 100, the identity of the operator to whom the tag 100 is assigned, and any other desired information is stored in a record. The process then proceeds to process block 507, where the log in time is recorded.

The process proceeds to process block 508, where the log in time and the identifier of tag 100 that logged into the plant equipment 202 is transmitted to system hub 201.

The process proceeds the process block 509, where plant equipment 202 receives a logout request. In some embodiment, this log out request is received by having the user of plant equipment 202 press a log out button on the console. In some embodiments, the plant equipment 202 could itself generate the log out request after a certain period of not detecting the tag 100 within a zone of the plant equipment, such as 1 or 2 minutes or other amount of time. In some embodiments, when the sensors 301 detect the tag 100 has moved away from the machine, the tag 100 is logged out, and the logout event is recorded. The process 500 then proceeds to process block 510, where the log out time is recoded and then even further on to process block 511, where the log out event, recorded time, and tag 100 identifier, and any other desired information about the tag 100, the assigned operator, etc., are sent on to the system hub 201.

Figure 6:
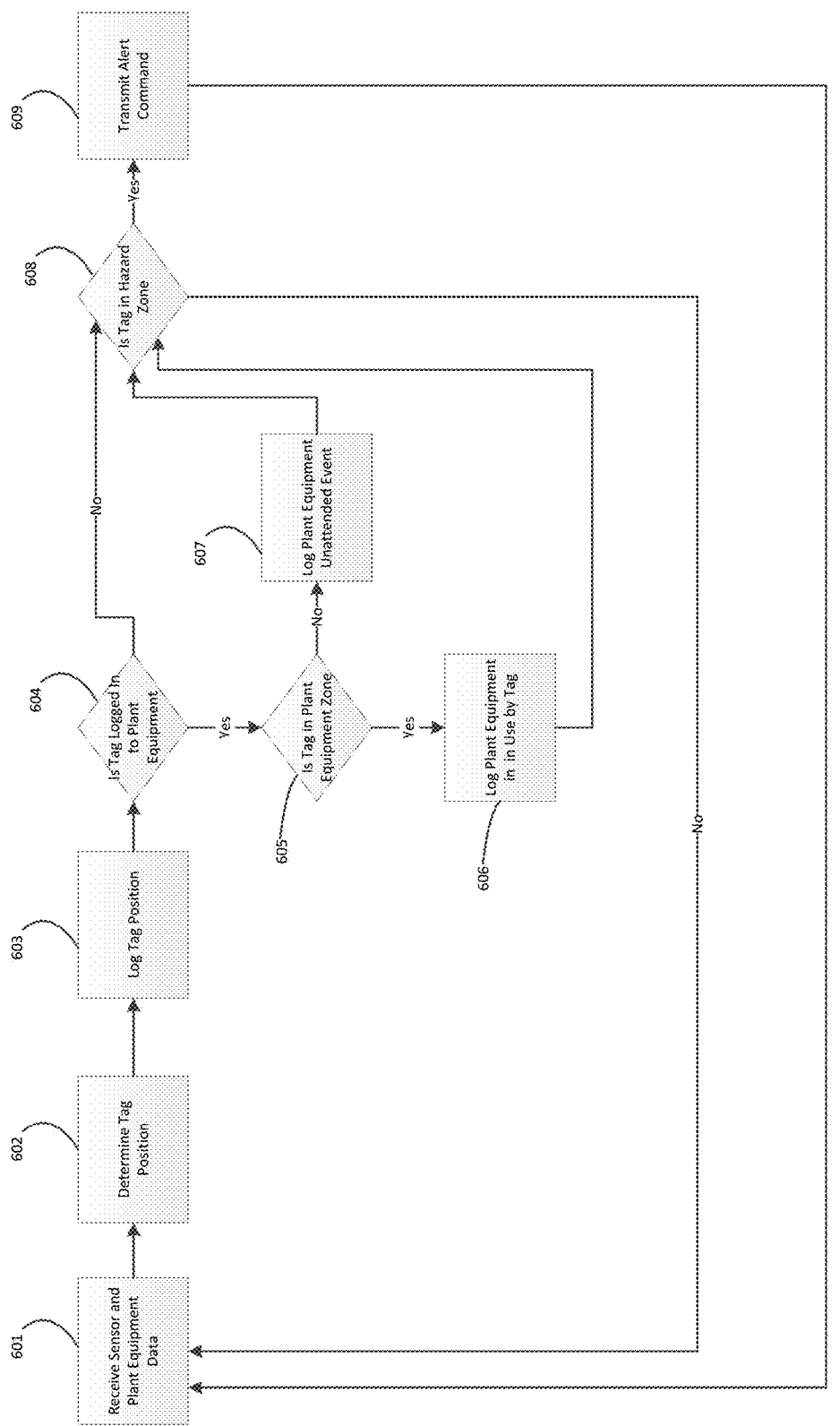
FIG. 6 displays a flow chart depicting a process for logging the position of various employee badges.

FIG. 6 shows a flow chart depicting a process 600 for logging the position of various tags 100, for example, tags 100 embedded within employee badges. In some embodiments, the process begins in process block 601. In process block 601, the system hub 201 receives sensor data from all of the sensors 301. In some embodiments, the system hub 201 can also receive the log in and log out data from the various plant equipment 202. The process proceeds to process block 602.

In process block 602, the system hub 201 uses the sensor data to determine the position of all the badges 100 that it received sensor data for. For example, the system hub can determine the coordinates of the tag 100 based on the distance detected from each sensor 301, the connection strength or the connection existence of the tag 100's connection with various sensors 301, or based on the view of the badge in various cameras 204 in sensors 301, as described elsewhere herein. The process then proceeds to process block 603.

In process block 603, the system hub 201 logs the position of the tag 100 and associates the position with the identifier of the particular tag 100, and with the identity of a wearer to whom the badge is assigned. In some embodiments, this position is stored in a database along with a time that the particular location was determined. The process then proceeds to decision block 604.

In decision block 604, the system hub determines whether the various badges 100 are logged into a plant equipment 202. In some embodiment, the system hub 202 determines by whether a particular tag 100 is logged into a piece of plant equipment 202 based on the data received from the various plant equipment 202.

If there is a tag 100 logged into plant equipment 202, the process proceeds to decision block 605. In decision block 605, the system hub 201 determines whether the tag 100 is within the zone of the plant equipment 202 that the tag 100 is logged into. For example, if tag 100 is logged into the first plant equipment 310, the system hub 201 will determine if tag 100 is within zone 312. In some embodiments, the system hub 201 performs this operation by comparing the previously determined location of the tag 100 with the location of the zone as stored in a zone database. In some embodiments, if the plant equipment 202 that the badge is logged into does not have an associated zone, such as forklift 340, this step can be skipped. In some embodiments, the system hub 201 need not check whether the tag 100 is logged into plant equipment 202. In some embodiments, plant equipment 202 may not have a log in option to log in the badge. In such embodiments, the system hub 201 can detect the badge within the zone 312, and make a logical determination that the wearer of the tag 100 is performing work at the plant equipment 202 around which the zone 312 is located. In some embodiments, the system hub 201 requires more than one detection of the badge within the zone 312, or requires a certain dwell time within the zone 312 before logging in to the machine, or before making the logical determination that the wearer of the tag 100 is operating the plant equipment 202 around which the zone 312 is located. This can avoid a spurious indication that the wearer of a tag 100 is working on plant equipment 202 when the wearer of the badge was just walking by, or transiting through the zone 312.

If the badge is in the correct zone, the process moves to process block 606 and the system hub 201 logs a "plant equipment in use by badge" event. In some embodiments, the system hub will then similarly log a "plant equipment use end" event when it receives a corresponding logout event from the plant equipment 202 in process step 601. If the badge is not in the correct zone, the process then proceeds to process block 607 and the system hub 201 logs a plant equipment unattended event. In the case where the tag 100 does not log in to the plant equipment 202, the system hub can similarly log a "plant equipment in use by tag" even after making the logical determination based on detecting the tag 100 within the zone 312. In either case the process then proceeds to decision block 608.

In decision block 608, the system hub 201 determines if the badge is in a hazard zone, such as hazard zone 330. In some embodiments, the system hub 201 determines if the tag 100 is in a hazard zone based on the calculated position of the tag 100 compared with the stored position of the hazard zone. If the tag 100 is not in the hazard zone, the process proceeds to process block 601.

If the tag 100 is in hazard zone, the process proceeds to process block 609. In the process block 609, the system hub can transmit an alert command to tag 100. The tag 100 can then emit a visual, audio or tactile alarm through audible transmitter 108. In some embodiments, this alert is transmitted from the system hub 201 to the sensors 301 and then to the tag 100 through the Bluetooth enabled chip 103 and RFID enabled chip 104. The process then returns to process block 601.

The system hub 201 can gather location data for a plurality of badges 100, plant equipment 202, vehicles, and the like at a facility, and can generate a real-time map of the facility. This information can be used to analyze how many personnel are needed to perform specific tasks on plant equipment 202, whether plant operation can be optimized by using more or fewer personnel on specific plant equipment 202, and can aggregate the sensed activity to build a model or predictive schedule for staffing, heat maps of tag locations, equipment run time, sort plans, and the like. A supervisor can have access to a terminal to show the facility map, including the location of personnel, to schedule personnel for tasks at specific equipment, to authorize badges to operate specific equipment, and the like.

In some embodiments, the system hub 201 can evaluate operation and staffing loads and determine how to staff and prepare a run plan for the next day, or for the same day next week. The system hub 201 can also receive additional information from the plant equipment, such as item load, items processed, run times, and the like, to use in operation and staffing prediction.

Figure 7:
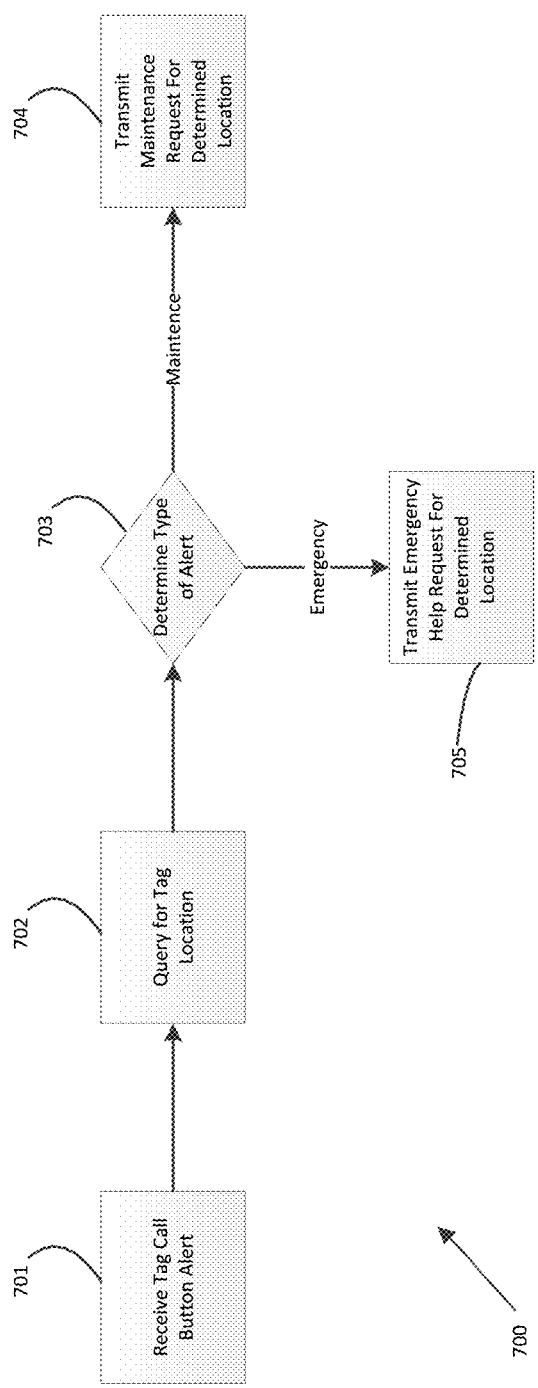
FIG. 7 displays a flow chart depicting a process for responding to a badge call button alert.

FIG. 7 shows a flow chart depicting a process for responding to a call button alert from tag 100. The process starts in process block 701. In process block 701, the system hub 201 receives a badge call button alert from tag 100. In some embodiments, this alert is transmitted from to system hub 201 from the sensors 301, which are in communication with tag 100 through the Bluetooth enabled chip 103 and RFID enabled chip 104. In some embodiments, the alert is transmitted after the wearer of tag 100 presses call button 109. In some embodiments, call button 109 is actually two separate buttons, a maintenance button and an emergency button. The process then proceeds to process block 702.

In process block 702, the system hub 201 queries for the badge location. In some embodiments, the system hub 201 queries for the badge location as it already determined in the parallel process disclosed in FIG. 6 in process block 602. The process then proceeds to decision block 703.

In decision block 703, the system hub 201 determines whether the badge call button alert is an emergency help request or a maintenance request. In some embodiments, the system hub determines this based on the alert it received. In some embodiments, the alert itself can indicate whether the wearer of tag 100 pressed the maintenance call button or the emergency call button.

If the alert type is an emergency, the process proceeds to process block 705. In process block 705, the system hub 201 transmits an emergency help request to the appropriate parties. In some embodiments, the appropriate parties can be emergency response people or the tag 100 wearer's supervisor. In some embodiments, the help request includes the previously determined the tag 100's location.

If the alert type is maintenance, the process proceeds to process block 704. In process block 704, the system hub 201 transmits a maintenance request to the appropriate parties. In some embodiments, the appropriate parties can be maintenance people or the tag 100 wearer's supervisor. In some embodiments, the maintenance request includes the previously determined the tag 100's location.

As described above, zones, boundaries, and/or virtual fences can be created around plant equipment 202, or other locations and devices in the facility. Such boundaries can be manually established by drawing lines within a virtual model of the facility. In some embodiments, boundaries can be established as intelligent work zones using information gathered from the tags 100 of operators, and can be adjusted continuously or with a defined periodicity.

The intelligent work zone boundary can reduce the risk of logging out, miscalculating, or misallocating actual work hours because the operator moved outside the manually-defined, software-defined virtual fence, zone or boundary, even though the operator is actually working on the specific operation work zone. The intelligent work zone boundary automatically predicts the work zone for an operation and auto-calibrates the boundaries for the plant equipment 202 based on data from sensors. Intelligent work zone boundaries will reduce the time spent on manually-defining work zones and reduce the risk of errors associated with inaccurately sized work zones. Intelligent work zone boundaries are established by passively gathering active sample sensor data for a defined period through a combination of either providing active sensor tags 100 to operators for a specific operation and/or laying sensor tags in fixed locations. After passively gathering the sensor tag location data from normal work flow over the defined period, either a supervised and/or an unsupervised machine learning statistical model is applied to the active sensor location data to identify the probable work zone which is defined as the collection of some amount, for example, 95%, 99.9%, 99.99%, etc. of sensor coordinates.

Figure 8:
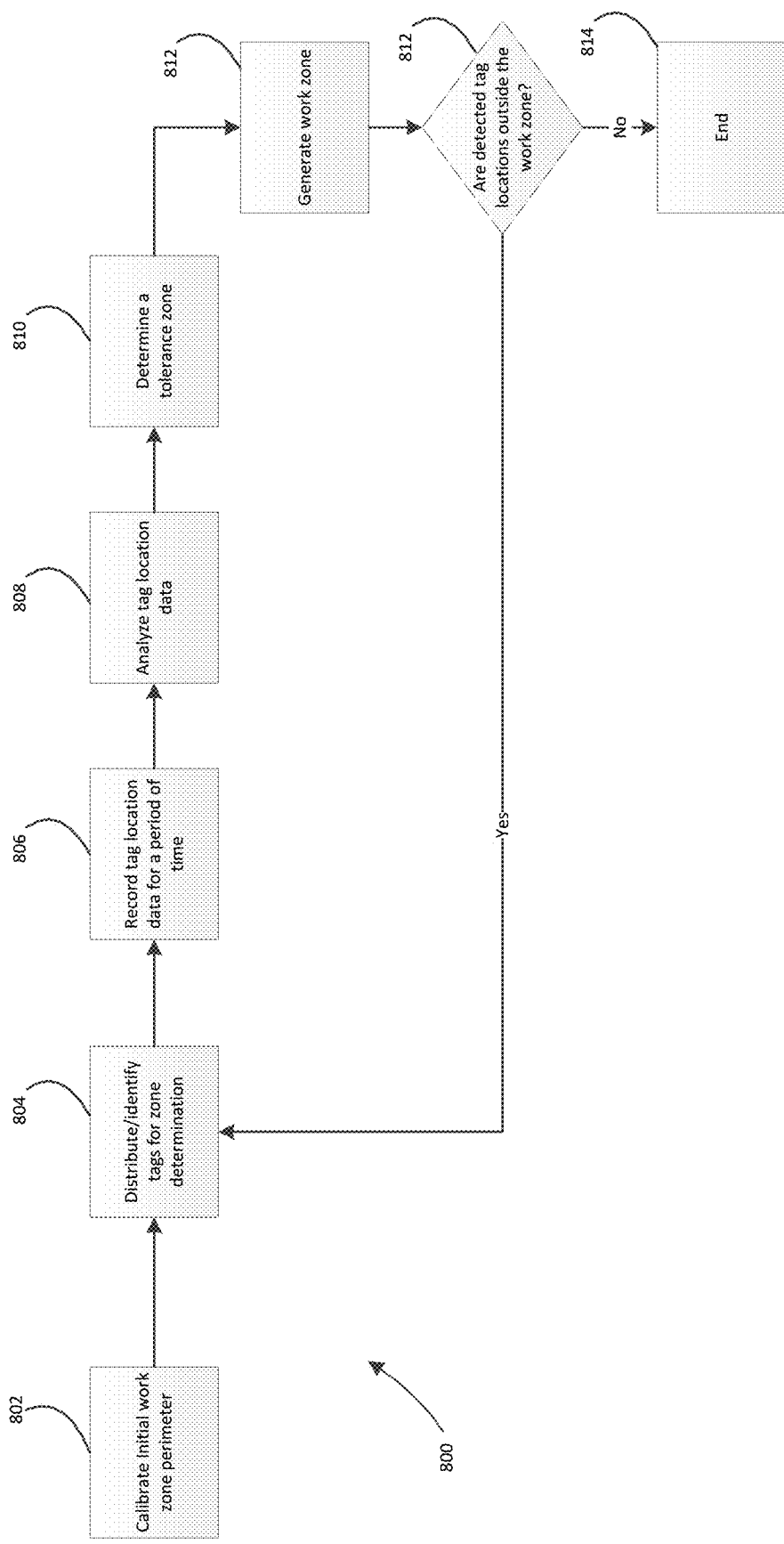
FIG. 8 is a flow chart depicting an exemplary process for generating an intelligent work zone boundary.

FIG. 8 is a flow chart depicting an exemplary process for generating an intelligent work zone boundary. A process 800 begins in block 802, wherein an initial work zone perimeter is calibrated. The initial work zone perimeter can be established by utilizing a number of tags 100 within the facility, the tags placed at physical locations around the plant equipment 202. For example, a tag 100 can be placed in fixed physical locations at a specified distance from sides, ends, corners, etc. of the plant equipment 202. The sensors 301 are activated to read, detect, and/or record the position of these fixed-position tags 100. Because there is some natural bounce, jitter, or inaccuracy in detecting exact locations of these tags 100, the results of mapping the detected location of the tags 100 around the plant equipment 202 will have some scatter and some outlying detected positions. To calibrate the initial work zone perimeter, the system hub 201, or other component or processor of the system 200, can draw a line in a virtual model or map of the facility which encompasses a threshold number of the detected locations. In some embodiments, the initial work zone perimeter can be drawn to encompass 99% of all the detected and/or mapped locations of the fixed location tags 100.

The process 800 moves to block 804, wherein tags are distributed to operators, or tags of operators around a certain piece of equipment are identified for use in the zone determination process. For example, where the plant equipment for which an intelligent work zone is to be determined, operators are identified who are working at the equipment, or who will be working at the equipment. The position data for the tags 100 assigned to these operators will be used in the intelligent work zone determination.

The process 800 moves to block 806, wherein the locations of the tags 100 assigned to the operators are detected and recorded for zone determination. The system 200 stores the location data of these tags 100 for use in determining the work zone.

The process 800 moves to block 808, wherein the recorded tag data is analyzed. Analyzing the tag data can include generating a heat map of the tags showing the relative frequency at which an operator is detected at a different locations at which the operator is most frequently located. A key value array can be generated to determine a pixel burn value. The burn value can be the count of times a pixel is repeated within the key value array, and the count can have a factor applied for visualization purposes. The most frequently visited locations will have a higher burn value than those that are visited by operators less frequently. The heat map's unique burn values can be arranged in descending sequential order. The pixels referenced here can be pixels on a display device in communication with the system hub on which a virtual map or model of the facility is able to be shown. The pixels can be overlain onto the map or model of the facility on the display device.

The process 800 moves to block 810, wherein a tolerance zone is determined. The tolerance zone can be the threshold of burn values to be used to set the intelligent work zone. The tolerance zone can be set equal for all equipment or areas in a facility. In some embodiments, the tolerance zone can be set for each individual equipment or area for which an intelligent work zone is to be established. For example, a higher tolerance zone may be selected for equipment which is in a part of the facility which is covered by relatively fewer sensors 301, or which has some structure or other factor that interferes with sensor 301 accuracy or detection ability. A greater tolerance (i.e., a lower threshold) may be used in such a case to avoid drawing an intelligent work zone that is overly restrictive, or would mischaracterize more tag locations due to the sensor 301 accuracy. In some embodiments, a greater tolerance zone can be used based on the threshold used in the initial work zone perimeter calibration. For example, if the threshold for the initial work zone perimeter calibration is higher, that is, more detected calibration locations were included, a greater tolerance zone can be used, and vice versa. In some embodiments, if the sensor 301 accuracy is known to be higher, then a smaller tolerance zone, or higher threshold can be used. In some embodiments, the tolerance zone may be determined based on the footprint of the equipment, the number of operators using the equipment, and the like. If a piece of plant equipment as a large or irregular footprint, then a greater tolerance zone may be advantageous. Similarly, at a piece of plant equipment that is run by more than one operator may have a greater tolerance zone to account for the need for operators to walk around one another while operating the machine.

In some embodiments, the tolerance zone can be set at 90%. This means that 90% of the burn values from the sequential burn value list can be filtered to include the highest 90% burn values, sorted from the largest x and y pixel coordinate values to the smallest x and y pixel coordinate values. In some embodiments, the system hub 201 can identify the x and y pixels with the smallest value within the filtered array, and the largest x and y pixels in the filtered array.

The process 800 moves to block 812, wherein the work zone is generated. The work zone is generated using the filtered, sorted array of pixels in the tolerance zone. The pixels are used to create the boundaries of the zone, and are recorded in the map or model of the facility. The work zone becomes a boundary, virtual fence, etc. which can be used as described elsewhere herein. In some embodiments, the work zone is generated by using the different permutations of the smallest and largest x and y pixels to represent the four corners of a rectangular work zone.

The process 800 moves to decision state 812, wherein it is determined whether, during normal equipment operation, the tags 100 of operators assigned to the plant equipment, are generally within the work zone. During operation, a few of the tags 100 assigned to operators of the plant equipment may occur out of the work zone. A single detection, or a minimum number of detections out of the work zone can be determined to be erroneous, or if the duration was brief, can be ignored. However, the work zone can be reassessed if there are a significant number of tag 100 detections outside the work zone. For example, if a threshold number of tag detections are outside the work zone, this can trigger recalibration of the work zone. The threshold number can be 1%, 5%, or any other desired threshold. In some embodiments, if the system identify detections of the tags 100 which recur on subsequent shifts, days, or operations. A high number of detections outside the work zone or recurring detections outside the work zone can indicate that the work zone may need to be recalibrated or reevaluated. In some embodiments, the work zone is recalibrated at a specified periodicity, such as weekly, monthly, following maintenance evolutions, etc.

If the system hub 201 determines that the work zone needs to be recalibrated, the process returns to block 804. If the system hub 201 determines that the work zone does not need to be recalibrated, the process 800 moves to block 814, and ends.

Sometimes visitors, supervisors, or other personnel may tour a particular facility. A self-guided audio tour, or tour with a mobile computing device can be facilitated by using a tag 100. For example, the visitor can be given a tag 100, an audio device having a tag 100 thereon, or a mobile computing device having a tag thereon. The audio device and the mobile computing device can communicate wirelessly with the system hub 201. As the tag 100 moves through the facility, the location of the tag 100 is detected as described herein, and content, such as audio, video, etc. is provided to the audio device or mobile computing device based on the detected location of the tag 100. The content will be stored in the system 200 and be associated with a work zone, or location in the facility. When the tag 100 is within the work zone, or within an area of the facility associated with the content, the content, including information relevant to the location is which the tag 100 is detected is provided. This can standardize tours and provide opportunities for self-guided tours.

A supervisor can receive a live zone report. The live zone report can report to a supervisor the number and location of tags 100 within any zone of the facility. This can give the supervisor an impression of how many operators are working within the zone, and the supervisor can adjust to add more or reassign operators based on item load or volume for a particular machine or apparatus.

Using tags 100 on particular items can provide increased traceability through a facility. For example, high value items can be given tags 100, and the MAC or EID addresses associated with the tags 100 can be recorded or stored in a high value item file or database. Whenever the tracking system identifies that a high value item moves into a particular facility, for example, into facility 300, the system hub 201 can actively look for and identify the location of those high value items based on detecting the MAC or EID, or unique identifiers of those tags 100.

In some embodiments, if a sensor 301 detects the code or identifier, such as the MAC or EID from a tag 100 on the high value list, the system hub 201 can notify or communicate this information to a supervisor, operator, or to an entity outside the facility 300. A shipper of a high value item may be able to access the location information for the item via a web-interface using an API. In some embodiments, the location information accessible via the web-interface can be coarse location data, limited to the facility where the high value item is, and not necessarily the specific location of the item within the facility 300.

In some embodiments, the facility 300 can be a retail location, such as a post office. When a customer enters the store, the sensors 301 can detect that a device having a unique MAC or EID, such as the customer's mobile phone has entered the post office. By using the locations of customers' mobile phones within the post office, the system 200 can estimate a wait time for a customer to conduct a transaction at the counter. For example, if there are 10 unique mobile devices in a post office, the system hub 201 can use historic information about average transaction time, average transaction type, etc. to determine how long the wait time for a customer entering the post office can be. The historic information can be determined based on the average amount of time a mobile phone is detected within the counter area or a self-service area of the post office.

In some embodiments, the wait time notification can be pushed to the mobile phones. In some embodiments, the wait time can be displayed on a screen in the post office. If wait times in a particular retail area are getting high, a supervisor can be alerted and can take action to reduce the wait time.

In some embodiments, the system 200 can use the unique identifiers of mobile phones and their proximity to the counter area to analyze retail space utilization. A heat map or other map can be generated showing the density of devices within the facility, for example, showing areas of high traffic and low traffic.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The central hub 120 may comprise a processor such as, for example, a microprocessor, including but not exclusive to Pentium® processor, a Pentium® Pro processor, an 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 111 typically has conventional address lines, conventional data lines, and one or more conventional control lines.

The system may be used in connection with various operating systems such as Linux®, UNIX®, MacOS®, or Microsoft Windows®.

The system control may be written in any conventional programming language including but not exclusive to C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages including but not exclusive to Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

We claim:

1. A system for detecting the location of an item comprising:
   a plurality of sensors disposed within a facility at known locations within the facility;
   an item having a tag associated therewith, wherein the tag includes a unique identifier;
   a memory storing a virtual map of the facility, the virtual map identifying a plurality of zones within the facility;
   a processor in communication with the plurality of sensors and with the memory;
   wherein the plurality of sensors are configured to detect the unique identifier associated with the tag and transmit detection information to the processor;
   wherein the processor is configured to:
      receive a first signal from one or more of the plurality of sensors which detect the unique identifier associated with the tag;

determine a first location of the tag within the facility based at least in part on the signal from the one or more sensors and the known location of the one or more sensors;
identify a first zone of the plurality of zones that is associated with the determined first location;
receive a second signal from one or more of the plurality of sensors which detect the unique identifier associated with the tag;
identify a second location of the tag within the facility based at least in part on the signal from the one or more sensors and the known location of the one or more sensors;
determine a second zone of the plurality of zones that is associated with the determined second location;
determine whether the identified first zone is different than the identified second zone; and
record, in a memory, a logical handling event for the item when the identified first zone is different than the identified second zone.

2. The system of claim 1, wherein the identified first zone corresponds to item processing equipment.

3. The system of claim 2, wherein the second zone corresponds to a dock area of the facility.

4. The system of claim 1, wherein at least one of the plurality of sensors comprises a door sensor.

5. The system of claim 1, wherein the processor is further configured to access a sort plan for the item.

6. The system of claim 5, wherein the processor is configured to record a type of logical handling event based on the sort plan for the item.

7. The system of claim 1, wherein the item is a container, and wherein the container contains a plurality of mailpieces.

8. The system of claim 7, wherein, the processor is configured to record, in the memory, the logical handling event for each of the plurality of mailpieces contained within the container.

9. The system of claim 1, further comprising a user interface, the user interface configured to display the detected location of the tag on the virtual map of the facility.

10. The system of claim 9, wherein the user interface is configured to display recorded the logical handling event.

11. A method for detecting the location of an item comprising:
storing, in a memory, a virtual map of the facility, the virtual map identifying a plurality of zones within the facility;
detecting, via a plurality of sensors disposed within a facility at known locations within the facility, an item having a tag associated therewith, the tag including a unique identifier;
receiving, in a processor, a first signal from one or more of the plurality of sensors which detect the unique identifier associated with the tag;
determining, by a processor, a first location of the tag within the facility based at least in part on the signal from the one or more sensors and the known location of the one or more sensors;
identifying, by a processor, a first zone of the plurality of zones that is associated with the determined first location;
receiving, in a processor, a second signal from one or more of the plurality of sensors which detect the unique identifier associated with the tag;
identifying, by a processor, a second location of the tag within the facility based at least in part on the signal from the one or more sensors and the known location of the one or more sensors;
determining, by a processor, a second zone of the plurality of zones that is associated with the determined second location;
determining, by a processor, whether the identified first zone is different than the identified second zone; and
recording, in a memory, a logical handling event for the item when the identified first zone is different than the identified second zone.

12. The method of claim 11, wherein the identified first zone corresponds to item processing equipment.

13. The method of claim 12, wherein the second zone corresponds to a dock area of the facility.

14. The method of claim 11, wherein at least one of the plurality of sensors comprises a door sensor.

15. The method of claim 11, further comprising accessing, by a processor, a sort plan for the item.

16. The method of claim 15, wherein recording the logical handling event comprises recording a type of logical handling event based on the sort plan for the item.

17. The method of claim 11, wherein the item is a container, and wherein the container contains a plurality of mailpieces.

18. The method of claim 17, further comprising recording, in the memory, the logical handling event for each of the plurality of mailpieces contained within the container.

19. The method of claim 11, further comprising displaying, on a user interface, the determined first location of the tag and the determined second location of the tag on the virtual map of the facility.

20. The system of claim 19, further comprising displaying, on the user interface, the logical handling event.

* * * * *